United States Patent [19]
Kress et al.

[11] Patent Number: 5,346,344
[45] Date of Patent: Sep. 13, 1994

[54] CUTTING AREA

[75] Inventors: Dieter Kress, Aalen; Friedrich Häberle, Lauchheim; Günther Hertel, Nuremberg, all of Fed. Rep. of Germany

[73] Assignee: MAPAL Fabrik Für Prazisionswerkzeuge Dr. Kress KG, Aalen, Fed. Rep. of Germany

[21] Appl. No.: 861,768

[22] Filed: Apr. 1, 1992

[30] Foreign Application Priority Data

| Apr. 3, 1991 [DE] | Fed. Rep. of Germany | 4110720 |
| May 31, 1991 [DE] | Fed. Rep. of Germany | 4117765 |
| Sep. 26, 1991 [DE] | Fed. Rep. of Germany | 4132019 |

[51] Int. Cl.$^5$ ............................................. B23B 31/02
[52] U.S. Cl. ................................. 409/234; 279/2.12; 408/56; 408/239 R
[58] Field of Search .............. 409/232, 233, 234; 408/56, 57, 238, 239 R, 240; 279/2.12, 2.13, 2.14, 2.15, 6, 87; 82/159, 160

[56] References Cited

U.S. PATENT DOCUMENTS

| 4,844,671 | 7/1989 | Reinauer | 409/233 |
| 4,997,325 | 3/1991 | Heel et al. | 409/233 |
| 5,035,557 | 7/1991 | Kohlbauer et al. | 409/233 |
| 5,150,995 | 9/1992 | Reinauer | 408/239 R |
| 5,186,476 | 2/1993 | Heel et al. | 409/234 |
| 5,193,954 | 3/1993 | Hunt | 409/233 |

Primary Examiner—Daniel W. Howell
Attorney, Agent, or Firm—Anderson Kill Olick & Oshinsky

[57] ABSTRACT

An interface 1 between a tool carrier 5 and a clamping shaft 3 of a machine tool holding the tool carrier is proposed comprising a hollow fitting pivot 7 which is provided at the tool carrier and is provided with a first clamping surface 19 on its inner wall, comprising a recess 9 provided at the front wall 73 of the clamping shaft for receiving the fitting pivot, a clamping member 37 is arranged in this recess 9 and is axially displaceable inside the clamping pivot, the clamping member 37 is provided on its outer side with a second clamping surface 71 cooperating with the first clamping surface via clamping elements 69 which are arranged on the outside of the clamping member, can be swiveled out radially by the clamping member against a resilient restoring force, and can be made to engage with the first and second clamping surfaces, characterized in that the clamping elements 69 are arranged at the circumference of the clamping member constructed as clamping pin 37 so as to be freely movable in the axial direction and are pressed between the second clamping surface of the clamping pin and the first clamping surface in the fitting pivot during a displacement of the clamping member in the clamping direction, so that the two parts 3; 5 assigned to the interface 1 are securely clamped together.

18 Claims, 5 Drawing Sheets

CUTTING AREA

BACKGROUND OF THE INVENTION

The invention is directed to an interface between a tool carrier and a clamping shaft of a machine tool holding the tool carrier, which interface includes a hollow fitting pivot provided at the tool carrier and having an inner wall and a first clamping surface provided on the inner wall; an opening provided in a front portion of the clamping shaft for receiving the hollow fitting pivot, a clamping pin located in the opening, axially displaceable therein, and having a second clamping surface, and a plurality of clamping elements arranged outside the clamping pin and adapted to move radially against a biasing force into engagement with the first and second clamping surfaces for clamping the tool holder and the clamping shaft together.

As used here, interface refers generally to a connection point between an element of a tool system and a machine tool, but also to the connection point between individual elements of a tool system. As used here, elements of the tool system refer to adapters and receptacle elements of all types, i.e. rotary, drilling, milling or special tools, in addition to reducing and extension pieces. Workpiece carriers of every type can also be used.

It is known to couple elements of a tool system together by means of optional connection points. In so doing, it is essential that previously adjusted dimensions be maintained accurately after exchanging a tool or workpiece carrier. Moreover, sufficient coupling forces should be built up at the connection points in order to ensure a secure grip. It is also important that the interface be constructed in such a way that all movable parts are in the clamping shaft and not in the tool carrier. Efficiency is substantially increased thereby because a large number of tool carriers are used for a clamping shaft. The known systems do not take these requirements into account.

It is the object of the present invention therefore to provided a connection point, designated as interface, by which great precision can be achieved also after exchanging one of the clamped in elements so as to ensure a secure grip of the clamped in elements.

SUMMARY OF THE INVENTION

This object is met in an interface between a tool carrier and a clamping shaft of a machine tool holding the tool carrier, of the type described above, by arranging the clamping elements are arranged so as to be movable freely in the axial direction at the circumference of the clamping member constructed as clamping pin. The loading of the individual clamping elements is relatively slight as a result of their free movability. In particular, the clamping forces of one clamping element are not transmitted to another clamping element. When the clamping member is displaced in the clamping direction, the clamping elements are pressed between the second clamping surface at the clamping pin and the first clamping surface in the fitting pivot, so that the two parts of the interface are securely coupled. In so doing, only pressure force is exerted on the head area of the clamping elements. The flow of force passes via the clamping pin and head area of the clamping elements into the clamping shaft. Accordingly, the clamping elements can have a very thin-walled design so as to make very sensitive and precise contact. The clamping forces applied to the clamping member are distributed in a particularly uniform manner as a result of the freely movable clamping elements so as to ensure an exact clamping.

A preferred embodiment example of the interface is distinguished in that the clamping elements are accommodated in receiving pockets which are provided on the outside of the clamping pin. The clamping elements remain freely movable as seen in the axial direction. In this way the interface can be constructed in a very compact manner and faulty gripping of the interface can be avoided due to the free movability of the clamping elements. A particularly uniform clamping of the tool carrier in the clamping shaft is accordingly ensured.

Moreover, in a preferred embodiment form of the interface the receiving pockets are formed by guides which are fastened in the axial direction of the clamping pin at its circumferential wall, preferably so as to be accommodated in grooves provided in the latter. The spacing of the guides relative to one another, as measured in the circumferential direction, is adapted to the width of the clamping elements. Such receiving pockets are simple and inexpensive to produce. They ensure a free axial movability with a good guidance of the clamping elements.

In another preferred embodiment form of the interface at least one of the guides defining the receiving pockets projects into a groove provided on the inside of the recess receiving the clamping pin, so that the clamping pin is secured in such a way that it is movable in a reciprocating motion as seen in the axial direction, but is prevented from rotating inside the clamping shaft. This construction of the interface is distinguished in that it is very simple and accordingly inexpensive to realize.

Moreover, another preferred embodiment form of the interface is distinguished in that the clamping pin can be displaced in the axial direction relative to the clamping shaft by means of an angle drive. Particularly high clamping forces can be applied by means of such a construction, so that a great precision is ensured also after exchanging a tool carrier.

In a particularly preferred embodiment form of the interface the angle drive comprises a threaded sleeve, which is arranged coaxially to the clamping pin and provided with an internal thread, as well as an actuating member which rotates in cooperation with the threaded sleeve and is provided with a first toothed ring and in which the clamping pin comprises at least one area on its outer side which is provided with an external thread which can engage with the internal thread of the threaded sleeve. As a result of the threaded sleeve of the angle drive, forces can be exerted directly on the clamping pin which serve to clamp the tool carrier in the clamping shaft of the machine tool. High clamping forces can accordingly be transmitted to the clamping pin in a simple construction, so that an exact clamping is ensured.

Further, in a preferred embodiment form of the interface the threaded sleeve is provided with a second toothed ring cooperating with the first toothed ring and is constructed so as to be rotatable, while the clamping pin is fastened inside the clamping shaft in such a way that it can be reciprocated only in the axial direction. Relatively low frictional forces occur because only the threaded sleeve rotates in the clamping shaft of the machine tool, so that the forces applied during actuation of the angle drive serve to clamp in the tool carrier with low losses.

In another preferred embodiment form of the interface the angle drive is designed in such a way that its actuating member is constructed as a rotatable sleeve whose axis of rotation is vertical to the axis of rotation of the threaded sleeve and is so disposed that the first and second toothed rings engage. In such an arrangement of the elements of the angle drive, the two toothed rings can be produced in a particularly simple and accordingly inexpensive manner, wherein the clamping forces applied during actuation of the angle drive can be transmitted with low losses.

Further, a preferred embodiment form of the interface is distinguished in that an abutment cooperating with the clamping elements is provided which—during a movement of the clamping pin in the clamp-in direction—holds the clamping elements in such a way that the ends of the clamping elements opposite the abutment are pressed against the first clamping surface in the fitting pivot by the second clamping surface of the clamping pin and the two parts of the interface are accordingly securely coupled with one another. This construction of the interface is distinguished by particularly low friction losses, so that the forces applied during actuation of the interface serve to a great extent to clamp in the two elements. Dimensional tolerances of the clamping surfaces are compensated for and uniform clamping forces are generated in that the clamping elements can be displaced in the axial direction independently of one another. Since no tensile forces act on the clamping elements, they can be constructed so as to be particularly flexible so as to make uniform contact.

Further, in a preferred embodiment example of the interface the abutment is formed by a shoulder fixed in the axial direction. Such an interface is constructed in a simple manner and leads to optimal absorption of forces exerted by the clamping elements.

In another preferred embodiment form of the interface the clamping member is penetrated by a continuous longitudinal channel provided for guiding through a coolant and/or lubricant. Sealing means are correspondingly provided on the outside of the clamping member or clamping pin and ensure that the coolant/lubricant flows exclusively through the longitudinal channel and can not escape at the sides of the clamping pin. Thus, it is ensured that coolant and lubricant can also be inserted while the interface is being used.

For this reason another embodiment form of the interface is preferred because the front side of the clamping member is constructed in such a way that it can cooperate with a connecting branch which springs back from the tool carrier. Coolant/lubricant can be guided via this connecting branch. In this way, the coolant/lubricant can easily be guided from the clamping shaft to the tool carrier without hindering the axial movement of the clamping pin serving to clamp.

Moreover, in a preferred embodiment form of the interface the connecting branch is provided with a stop face, the clamping pin being movable against the latter. Thus, if the angle drive is not operated in the direction serving to clamp in the tool carrier, but rather in the opposite direction, the clamping pin moves against this stop face and accordingly presses the tool carrier out of the clamping shaft. That is, the interface is distinguished in that a simple disengagement of the two connected elements is possible.

In another preferred embodiment form of the interface the first clamping surface in the fitting pivot is constructed as a circumferentially extending shoulder. The fitting pivot can accordingly be produced in a simple manner and can be inserted into the counterpiece, as desired, when the two elements are clamped together.

Moreover, in a preferred embodiment form of the interface the second clamping surface at the clamping shaft is constructed as a circumferentially extending surface of an annular shoulder. The second clamping surface is accordingly also simple to produce. Moreover, the clamp-in forces can be built up reliably regardless of the relative position of the parts, that is, regardless of the relative rotation of the parts.

Further, in a particularly preferred embodiment form of the interface the clamping surfaces enclose an angle, particularly an angle of approximately 45°, with the longitudinal or rotational axis of the tool carrier or clamping shaft. In this way, there is a splitting up of forces in the cooperation of the clamping elements with the two clamping surfaces when the two elements are clamped together: One force component acts in practice in the axial direction so that the tool carrier and the clamping shaft of the machine tool are securely connected with one another, wherein the tool carrier is drawn toward the clamping shaft somewhat and a secure contact is thus ensured between the two parts. Accordingly, a predetermined adjustment of the tool carrier is provided even after it is exchanged, so that readjustment can be avoided in most cases.

Another preferred embodiment example of an interface comprises an actuating element which acts directly on the clamping pin and displaces the latter axially. Frictional forces occurring during the clamping of the two parts assigned to the interface are reduced to a minimum as a result of this construction. Accordingly, high clamping forces can be effected with relatively small forces acting on the actuating element. This results in a highly durable actuating element and a long service life of the interface.

In another particularly preferred embodiment form of the interface the actuating element is constructed as an eccentric which is situated substantially vertically relative to the center or rotational axis of the clamping pin. Such an actuating element is inexpensive to produce and can easily generate the required clamping forces.

Further, a preferred embodiment form of the interface is characterized in that a sliding piece which is displaceable in the axial direction inside the clamping shaft is provided between an eccentric pin of the eccentric and the clamping pin and cooperates with the eccentric pin, absorbs its forces, and transmits them to the clamping pin. The clamping forces applied by the eccentric pin are transmitted from the eccentric to the clamping pin particularly well in that the sliding piece is rotatably supported in the clamping pin, wherein punctiform or line [linear] loading is prevented.

In another preferred embodiment form of the interface the eccentric pin is constructed in such a way that it comprises a pressure surface region which is swivelable around the axis of rotation of the eccentric and whose radius conforms to the radius of a concave recess in the outer surface area of the sliding piece, so that the two aforementioned radii are substantially equal. This design results in an area pressure distributed along a relatively large area so that punctiform or line forces, and accordingly high wear, are prevented.

Finally, in a preferred embodiment form of the interface the axis of rotation of the sliding piece is shifted relative to the longitudinal axis of the clamping pin, resulting in a toggle lever effect when clamping, so that when the parts assigned to the interface have been tightened the eccentric can only be disengaged by overcoming an additional loosening moment. Accordingly, an unintentional disengagement of the interface is prevented in a highly reliable manner.

The invention is explained in more detail in the following with reference to the drawings:

DETAILED DESCRIPTION OF THE PREFERRED EMBODIMENTS

Figure 1:
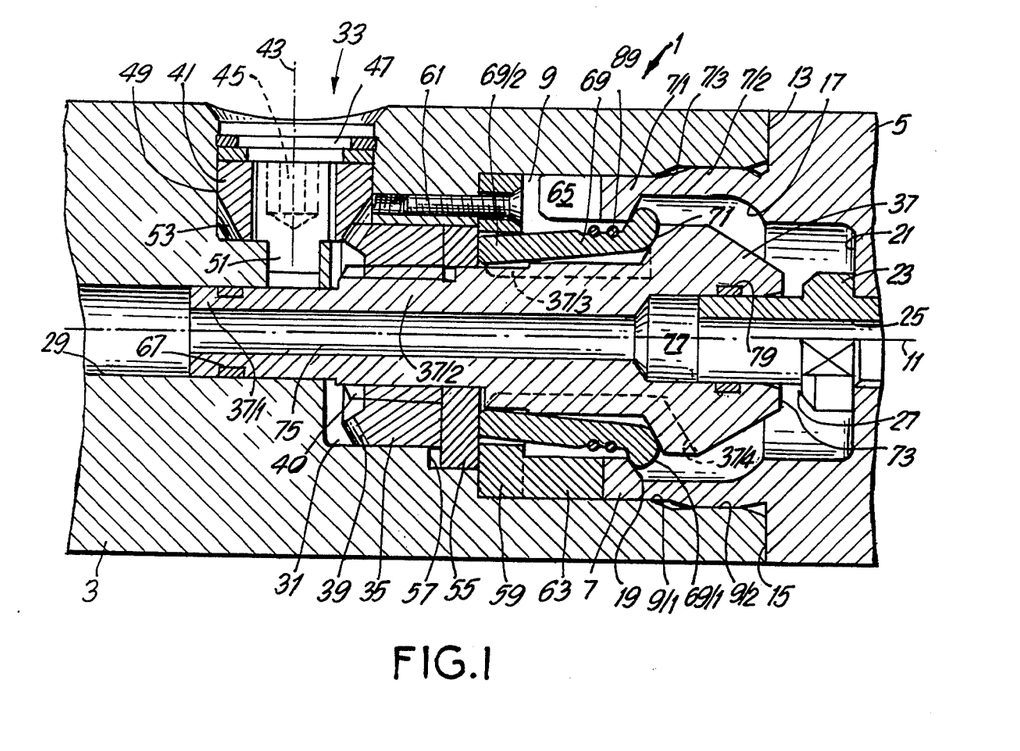
FIG. 1 shows a longitudinal section through an interface.

The longitudinal section according to FIG. 1 is restricted to the core of the interface. The connection of the clamping shaft, at left in FIG. 1, with a machine tool can be carried out in a known manner. The construction of the tool carrier, at right in FIG. 1, is likewise optional. The shaft of the tool carrier has been broken off in the drawing immediately following the interface.

It should be noted once again that the shown interface can be used in a multi-purpose manner as a connecting point, that is, also as a so-called separating point between an intermediate piece and a tool carrier.

A clamping shaft 3 of a machine tool is cut off in view at left in the interface 1, shown in section in FIG. 1, and a shaft of a tool carrier 5 is cut off on the right-hand side. The two parts to be connected are constructed in a circular-cylindrical manner in the area of the interface and have the same diameter in practice.

The tool carrier 5 is provided with a fitting pivot 7 whose outer diameter is selected in such a way that it can be inserted into a recess 9 of the front area of the clamping shaft 3. The fitting pivot 7 is provided in its root area with a first contact surface 13 which extends vertically relative to the longitudinal or rotational axis 11 and cooperates with a second contact surface 15 provided in the front area of the clamping shaft 3.

The fitting pivot 7 is provided with a first area 7/1 and a second area 7/2. The outer diameter of these areas differs, the front outer area 7/1 having a smaller diameter that the rear outer area 7/2 of the fitting pivot 7 closer to the first contact surface 13. The two areas are connected via a ramp 7/3.

The insertion of the fitting pivot 7 into the recess 9 of the clamping shaft 3 is facilitated by the outer areas which have different outer diameters. The recess is correspondingly provided with areas of different inner diameter which are designated in FIG. 1 by 9/1 and 9/2.

The fitting pivot 7 has a hollow construction. Its wall is provided, in the area of the front side of the fitting pivot, with an annular groove 17 whose wall extends substantially parallel to the rotational axis 11 in a large area. In the area of the front side, the annular groove 17 passes into a first clamping surface 19 extending at an angle relative to the rotational axis 11. The angle can be arbitrarily selected within a range of approximately 90° to 5°. An angle of 60° to 30° is preferred, particularly an angle of approximately 45°.

The first clamping surface 19 is constructed as a continuous annular shoulder.

A connecting branch 23 with a central through-channel 25 through which coolant and/or lubricant can be guided is provided at the base 21 of the hollow fitting pivot 7. An end face 27 of the connecting branch 23 assigned to the clamping shaft 3 serves as stop face.

The connecting branch 23 is fastened in an optional manner on the shaft of the tool carrier 5, e.g. by means of screws.

The clamping shaft 3 is also provided with a continuous channel 29 which in this instance is arranged concentrically relative to the rotational axis 11. It likewise serves for the guidance of a coolant and/or lubricant.

The recess 9 introduced in the front side of the clamping shaft comprises an area 31 with reduced inner diameter. A first element of an angle drive 33 is inserted in the latter, namely a threaded sleeve 35. The sleeve is so dimensioned that its outer diameter substantially corresponds to the inner diameter of the area 31 of the recess 9. Its inner diameter is selected in such a way that it grasps a clamping pivot, which is formed as a clamping pin 37. It is provided with an internal thread which engages with an external thread provided in this area of the clamping pin 37. The sleeve comprises a first toothed ring 39 in its end area remote of the front side of the clamping shaft 3, which toothed ring 39 is part of the helical [spiral] gearing.

The counterpiece of the helical gearing is situated on the second element of the angle drive 33, namely on an actuating member 41 which is constructed as a circular cylinder and is arranged in such a way that its rotational axis 43 extends vertically relative to the rotational axis 11. The actuating member 41 is constructed somewhat in the manner of a stud screw and comprises a hexagon socket 45 on its front side facing the outer circumferential surface of the clamping shaft 3. The actuating member 41 is fastened in a bore hole 49 in the clamping shaft 3 in a suitable manner, e.g. by means of an annular spring 47. The actuating member 41 may be provided with a centering pin 51 on its front side facing the rotational axis 11 serving as additional guidance for the actuating member 41.

The actuating member 41 is provided on its underside with a second toothed ring 53 which engages with the first toothed ring 39.

A rotation of the actuating member 41 causes a rotation of the threaded sleeve 35 as a result of the toothed rings 39 and 53. For this reason, the threaded sleeve 35 is arranged inside the area 31 of the recess 9 so as to be freely rotatable. A longitudinal movement of the threaded sleeve 35 is prevented by the actuating member 41 on the one hand and by an abutment 55 on the other hand, which abutment 55 is arranged in a suitable annular groove area 57 in the recess 9 of the clamping shaft 3. One or more washers, for example, can be used as abutment 55. They are secured against axial displacement, i.e. displacement in the direction of the rotational axis 11, by a driver disk 59 in the housing recess 57.

The driver disk 59, which preferably has an annular construction, is fastened at the clamping shaft 3 by suitable fastening means, e.g. by one or more screws 61. The screws extend through the driver disk 59 into the base body of the clamping shaft 3 and cooperate in the latter with a thread. The screw shown in FIG. 1 can be arranged at an optional location in the circumferential area of the driver disk 59.

The driver disk 59 comprises a projection 63 which springs away from the disk, projects axially relative to the end face of the clamping shaft 3 and engages in a suitable recess 65 in the front side of the fitting pivot 7. The driver disk can have one or more such projections 63. They serve to transmit torque from the fitting shaft 3 to the tool carrier via the clamping pivot 7.

The clamping pin 37 serving as clamping member comprises a plurality of areas with different outer diameters. In its left-hand area 37/1, the outer diameter of the clamping pin is selected in such a way that it can be inserted into the through-channel 29 in the clamping shaft 3. A sealing device 67 which is preferably constructed as an O-ring and prevents the escape of coolant or lubricant from the through-channel 29 is also provided there. In a second area 37/2, the outer diameter of the clamping pin 37 is selected in such a way that the external thread 40 provided there engages with the internal thread of the threaded sleeve 35. The third area 37/3 has a greater outer diameter. It serves to support clamping elements 69 arranged at the circumference of the clamping pin 37. The adjoining area 37/4 is provided with an even greater outer diameter. A second clamping surface 71 which is constructed somewhat in the manner of a circumferentially extending annular shoulder is formed in the transition area between areas 37/3 and 37/4. The outer area 37/4 of the clamping pin 37 reduces in diameter in the direction of the end face 73 of the clamping pin 37. The reduced diameter serves to facilitate the sliding of the fitting pivot 7 over the clamping pin 37 while the clamping shaft 3 and the tool carrier 5 are joined.

The clamping pin 37 is provided with a through-channel 75 for the coolant and/or lubricant arranged coaxially to the rotational axis 11. This channel comprises a widened area 77 in the vicinity of the end face 73. The inner diameter of this widened area 77 is adapted to the outer diameter of the connecting branch 23 in the tool carrier 5. The connecting branch projects into the clamping pin 37 far enough so that a secure sealing of the through-channel is always ensured even during the axial displacement of the clamping pin. A sealing member 79 is also provided in this area.

Figure 2:
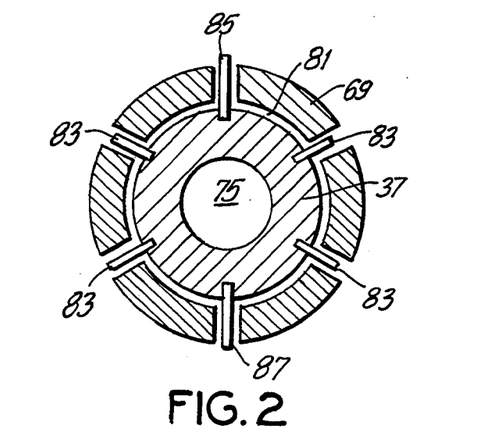
FIG. 2 shows a cross section through a clamping pin used in the interface according to FIG. 1.

FIG. 2 shows a cross section through the clamping pivot 37 of the interface 1 shown in FIG. 1. Identical parts are provided with the same reference numbers so that an extensive description thereof can be dispensed with. The clamping pin 37 is surrounded by six clamping elements 69 in the embodiment example shown here. The outer surfaces of the clamping elements are curved in a circular arc shape. It can be seen that the clamping elements are arranged in receiving pockets 81 which are defined laterally by guide elements 83.

When the six clamping elements 69 are inserted into the respective receiving pockets 81 an outer circular contour results. Two guide elements 85 and 87 inserted in corresponding recesses in the clamping shaft 3 project over the imaginary circumferential line of the entire arrangement at two locations. In the embodiment example shown here, these guide elements 85 and 87 engage in grooves, not shown, of the driver ring 59 and accordingly prevent a rotational movement of the clamping pin 37 inside the clamping shaft 3. A longitudinal movement of the clamping pin 37 is in no way limited or hindered by these two guide elements 85 and 87.

The continuous channel 75 for the coolant/lubricant can be seen clearly in the view according to FIG. 2.

The function of the interface is discussed in more detail in the following.

In order to produce the finished connection shown in FIG. 1 the tool carrier 5 is connected with the clamping shaft 3 in that the fitting pivot 7 of the tool carrier 5 is inserted into the recess 9 in the front side 73 of the clamping shaft 3. The areas 7/1 and 7/2 of the outer circumference of the fitting pivot 7 facilitate the insertion. At the same time, the fitting pivot is centered in the recess 9 by the clamping pin 37. The insertion of the fitting pivot is facilitated in that the front side 73 of the clamping pin 37 projects over the second annular surface 15 which forms the end face of the fitting pivot 7 and is enclosed by a conically extending surface.

When inserting the fitting pivot 7 into the recess 9, the clamping elements 69—in contrast to FIG. 1—are located in their position of contact with the outer surface of the clamping pin 37. The actuating member 41 and accordingly, due to the interplay between the toothed rings 53 and 39, the threaded sleeve 35 are rotated until the clamping pin 37 is moved completely to the right because of the cooperation of the internal thread in the threaded sleeve 39 and the external thread 40 in the area 37/2 of the clamping pin 37. The head area 69/1 of the clamping elements 69 can accordingly contact the outer circumference of the clamping pin 37. Elastic restoring members, e.g. rubber rings 89, act on the clamping elements 69 and press them against the circumferential wall of the clamping pin 37.

The outer diameter of the clamping pin in the region of the head area 69/1 is small enough in the applied state of the clamping elements to allow the clamping pin 37 to be introduced into the hollow space in the fitting pivot 7 with the head area 69/1 of the clamping elements 69.

The work carrier 5 is inserted into the clamping pivot 3 in such a way that the radial guide surfaces 13 and 15 contact one another. The actuating member 41 is subsequently turned, e.g. with a suitable socket wrench via the hexagon socket 45, and accordingly the threaded sleeve 35, in turn, is set in rotational movement. The clamping pin 37 is prevented from rotating by the guide elements 85 and 87, shown in FIG. 2, so that an axial movement of the clamping pin 37 to the left in FIG. 1, i.e. in the clamping direction, is effected by the interplay of the internal thread in the threaded sleeve 35 and external thread 40 on the clamping pin 37. The latter is displaced to the left when the two parts 3 and 5 are clamped, so that the head area 69/1 of the clamping elements 69 is forced outward radially by the second diagonal surface 71 and a radial widening is effected in the region of the head areas 69/1 of the clamping elements 69. The clamping elements contact the first clamping surface 19 of the fitting pivot 7 with their head area. A fixed contact between the two clamping surfaces 19 and 73 and the head area 69/1 of the clamping elements 69 takes place by means of a further rotating movement of the threaded sleeve 35. Axial clamping forces are built up by the diagonal position of the clamping surfaces so that the two annular surfaces 13 and 15 are pressed securely against one another and the tool parts are exactly aligned relative to one another and their rotational axes are aligned and form the common rotational axis 11 of the interface 1.

When the two parts to be clamped are incorrectly aligned or when there are dimensional tolerances of the clamping surfaces, the clamping elements can change their position in such a way, due to the free movability of the clamping elements 69 in the axial direction, that they can apply a clamping force which is uniform all around. Different clamping forces within the clamping elements 69 are ultimately prevented so that there is a fixed contact of the annular surfaces 13 and 15 in their entire circumferential area without substantial differences occurring in the axial clamping forces.

While the clamping pin 37 is moved to the left in the clamping direction because of the actuation of the angle drive 41, 45, the clamping elements 69 make contact with the abutments 55 with their end areas 69/2. It is not possible then for them to carry out an axial defecting movement to the left. The head areas 69/1 of the clamping elements 69 are accordingly clamped in between the two clamping surfaces 19 and 71 in an optimal manner.

Evidently, it is unimportant for the interplay of the clamping planes 9 and 71 with the head areas 69/1 of the clamping elements 69 whether the clamping pin 37 is moved directly by the clamping sleeve 35 or whether intermediate elements are provided here which effect an axial displacement of the clamping pin 37. It is also possible in principle that the clamping pin 37 is set in rotation and accordingly displaced axially along a stationary threaded area. However, frictional forces are generated in the clamping area of the heads of the clamping elements so that the rotational movement of the clamping pin 37 is somewhat impeded.

Finally, it can be seen that the circumstances can ultimately also be reversed. Moreover, it is conceivable to provide the fitting pivot 7 at the clamping shaft and the recess 9 at the tool carrier.

In order to loosen the connection, the actuating member 41 is turned in the opposite direction so that an opposite rotational movement of the threaded sleeve 35 is effected via the toothed rings 53 and 39. The clamping pin 37 is accordingly displaced axially to the right from the locking position shown in FIG. 1. The clamping surfaces 19 and 71 accordingly move away from the head area 69/1 of the clamping elements 69 so that the axial clamping forces cease. The clamping elements 69 are swiveled back into their starting position in the receiving pockets 81 by the elastic elements 89, so that their inner sides facing the clamping pin 37 extend parallel to its outer surface. Finally, the clamping pin 37 moves toward the front until its front side 73 engages in a work connection with the stop 27 of the connecting branch 23. Finally, the clamping pin 37 pushes the tool carrier 5 somewhat out of the recess 9 of the clamping shaft 3. This achieves at least a loosening of the two elements. It is unimportant for the function of this loosening whether the end face 73 of the clamping pin 37 stops at the connecting branch 23 or at the base area 21 of the hollow fitting pivot 7.

As can be seen from FIG. 1, the sealing means 67 and 79 are constructed so as to ensure a sealing of the channel for the rinsing or cooling medium extending in the interior of the tool parts in all positions during the axial displacement of the clamping pin 37.

Altogether, it can be seen that the interface described here ensures a uniform contact of the fitting surfaces 13 and 15 all around, so that the dimensions can be maintained very accurately also when exchanging the tool carrier. In so doing, it is ensured that very uniform clamping forces are built up by the clamping elements 69 which are freely movable in the axial direction relative to one another, wherein the clamping forces are not transmitted from one clamping element to the next, so that fatigue symptoms are practically eliminated.

The view according to FIGS. 3 to 6 is limited substantially to the core of the interface. In particular, the shaft of the tool carrier is broken off immediately following the interface. The clamping shaft of the interface can be connected with a machine tool in an optional manner. For example, in the embodiment example shown here an assembly flange enclosing the clamping shaft is selected for fastening at the machine tool.

It is also noted here that the shown interface is usable in a multi-purpose manner as a connecting point, that is, also as a so-called separating point between an intermediate piece and a tool carrier.

Figure 3:
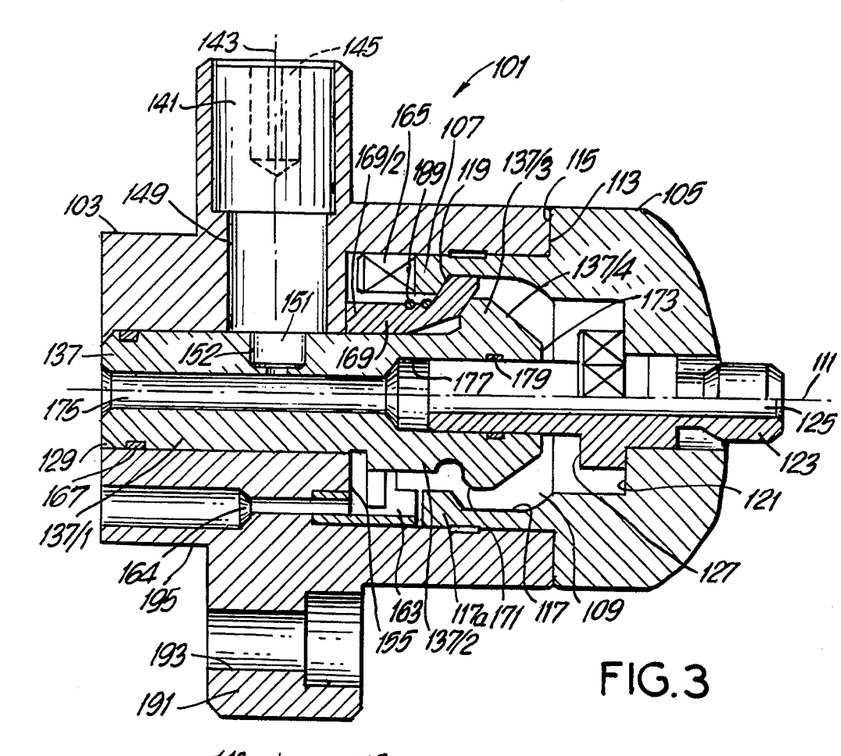
FIG. 3 shows a schematic longitudinal section through a first embodiment exile of an interface in the clamped state.

A clamping shaft 103 can be seen at left in the longitudinal section through the interface 101 according to FIG. 3, a clamping shaft of a tool carrier 105, shown at right, being inserted into the clamping shaft 103. The two parts assigned to the interface are constructed in a circular-cylindrical manner at least in this area and have practically the same diameter.

The tool carrier 105 is provided with a fitting pivot 107 whose outer diameter is selected so as to be smaller that the outer diameter of the rest of the tool carrier 105.

The fitting pivot 107 engages in a recess 109 introduced in the front area of the clamping shaft 103. When the fitting pivot 107 of the tool carrier 105 is inserted into the recess 109 of the clamping shaft 103, a first contact surface 115 of the tool carrier 105 which is arranged in the root area of the fitting pivot 107 and extends vertically relative to the longitudinal or rotational axis 111 contacts a second contact surface 113 enclosing the recess 109 in the front area of the clamping shaft 103 so as to ensure an exact alignment of the two parts assigned to the interface 101.

The fitting pivot 107 has a hollow construction and is provided on its inner side with a preferably circumferentially extending annular groove 117 whose wall extends substantially parallel to the rotational axis 111. A preferably circumferentially extending annular shoulder 117a is provided in the area of the end face of the fitting pivot 107, so that a first clamping surface 119 is formed which extends at an angle relative to the rotational axis 111 and increases in the direction of the wall in the area of the annular groove 117 as seen from the front side of the fitting pivot 107. The angle can be arbitrarily selected and can be approximately 90° to 5°, preferably 60° to 30°, particularly approximately 45°.

A connecting branch 123 with a central through-channel 125 through which a coolant and/or lubricant can be guided is provided at the base 121 of the hollow fitting pivot 107. The end face 127 of the connecting branch 123 facing the clamping shaft 103 can be utilized as a stop face.

The connecting branch 123 is fastened in the shaft of the tool carrier 105 in an optional manner.

The clamping shaft 103 is also provided with a continuous channel 129 which is arranged concentrically with respect to the rotational axis 111 in this instance. It also serves for the feed of a coolant and/or lubricant.

The channel 129 receives a clamping pivot 137 whose outer diameter is adapted to the inner diameter of the channel. An actuating member constructed as an eccentric 141 is inserted into the wall of the clamping shaft 103, its rotational axis 143 being arranged vertically relative to the rotational axis 111 of the clamping shaft 103. The eccentric 141 is constructed so as to be circular-cylindrical in cross section and can comprises areas of different outer diameters, as shown in FIG. 3. It is provided, in its outer end face, with a hexagon socket 145 in which a suitable tool can engage so as to enable a rotation of the eccentric around its rotational axis 143.

The eccentric 141 is accommodated in a bore hole 149 in the wall of the clamping shaft 103 whose inner surface is adapted to the outer contour of the eccentric 141.

The eccentric 141 comprises an eccentric pin 151 on its end face facing the clamping shaft 137, which eccentric pin 151 is arranged so as to be offset relative to the rotational axis 143 of the eccentric 141 and engages in a groove 152 inserted in the circumferential surface of the clamping pivot 137. It can be seen from FIG. 3 that the width of the groove 152 is adapted to the outer diameter of the eccentric pin 151, i.e. the width of the groove corresponds to the outer diameter of the eccentric pin 151 whose outer diameter is reduced relative to the outer diameter of the eccentric 141.

The radially extending defining surface or base of the recess 109 serves as an abutment 155 for clamping elements 169 which will be discussed in more detail in the following.

The interface 101 is provided with a known device for transmitting the torque applied by the machine tool. A driver wedge forming a projection 163 is arranged in the clamping shaft 103 in this instance and is held additionally by a screw 164 penetrating the base body of the clamping shaft 103 so as to extend in the radial direction. However, the fastening of the projection is irrelevant as regards the transmission of the torque. This projection engages in a suitable recess 165 in the front side of the fitting pivot 107, which recess 165 penetrates the wall of the latter in the axial direction. The width of the recess is adapted to the width of the projection 163 in such a way that the drive forces of the clamping shaft 103 can be transmitted substantially without play. The recess 165 is arranged in the front side of the fitting pivot 107 so that the projection 163 engages in it when the tool carrier 105 is inserted into the clamping shaft 103.

The clamping pin 137 serving as clamping member comprises a plurality of areas with different outer diameters. In its left-hand area 137/1, the outer diameter of the clamping pin is selected in such a way that the latter can be inserted into the through-channel 129 in the clamping shaft 103. A sealing device 167, which is preferably constructed as an O-ring, is also provided in the through-channel 129 and prevents coolant or lubricant from escaping from the latter 129. In a second area 137/2, the outer diameter of the clamping pin 137 is selected in such a way that its insertion into the through-channel 129 in the clamping shaft 103 is limited. A kind of stop is provided there by the larger outer diameter.

In this second area 137/2 a plurality of clamping elements 169 extending in the longitudinal direction of the clamping shaft 103, i.e. parallel to the rotational axis 111 of the interface 101, are arranged on the outer side of the clamping pin 137 in suitable recesses or pockets.

The clamping pin 137 also comprises a third area 137/3 with an even greater outer diameter. In the transitional area between the second area 137/2 and the latter area 137/3, a second clamping surface 171 is formed which is constructed circumferentially somewhat in the manner of an annular shoulder. The second clamping surface increases in the direction of the front side 173 of the clamping pin 137. The foremost outer area 137/4 of the clamping pin 137 decreases in diameter in the direction of its end face 173. The reduction in diameter serves to facilitate the insertion of the hollow fitting pivot 107 over the clamping pin 137 when the clamping shaft 103 and the tool carrier 105 are joined.

The clamping pin 137 is provided with a through-channel 175 for the coolant and/or lubricant arranged coaxially relative to the rotational axis 111. This channel comprises a widened area 177 opening into the end face 173. The inner diameter of this widened area is adapted to the outer diameter of the connecting branch 123 in the tool carrier 105. The connecting branch 123 projects into the clamping pivot 137 far enough so that a reliable sealing of the through-channel is always ensured even during axial displacement of the clamping pin. A sealing member 179 which is arranged so as to be countersunk in the inner surface in the widened area 177 and contacts the outside of the connecting branch is also provided in this area.

Figure 4:
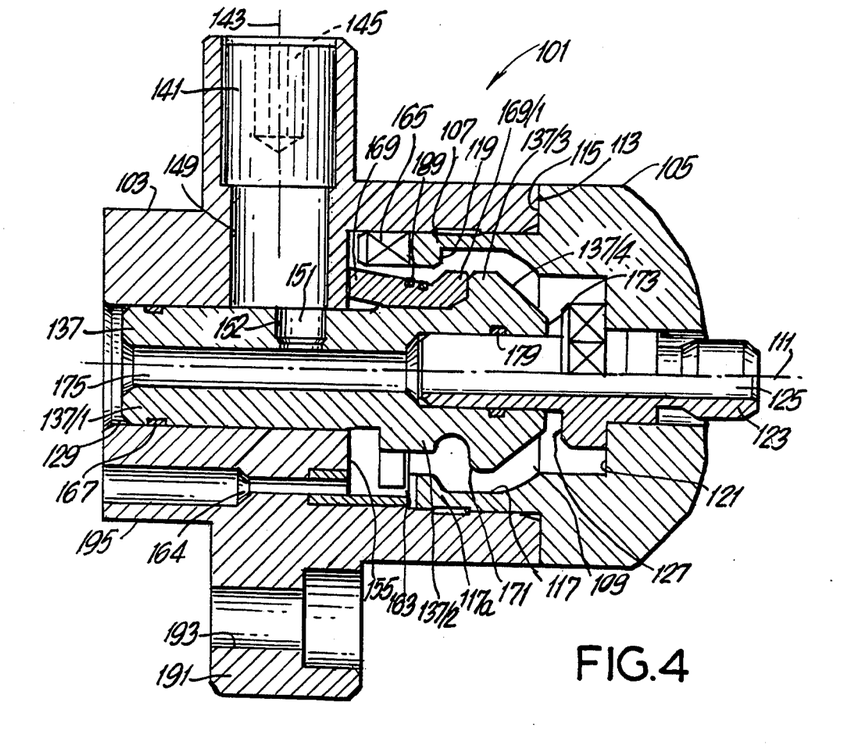
FIG. 4 shows a schematic longitudinal section through the interface shown in FIG. 1 in unlocked state.

The longitudinal section according to FIG. 4 shows the interface 101 as shown in FIG. 3. Identical parts are provided with the same reference numbers so that an extensive description thereof can be dispensed with.

In the view according to FIG. 4, the clamping elements 169—in contrast to the view according to FIG. 3—are in their unlocked position. The clamping pin 137 has been displaced by the eccentric pin 151 into its right-hand position in that the eccentric 141 has been rotated relative to the position shown in FIG. 3. The clamping elements 169 can accordingly contact the outer surface of the clamping pin 137. Elastic restoring members, e.g. rubber rings 189, act on the clamping elements 169 and press them against the circumferential wall of the clamping pin 137.

The number of clamping elements 109 can be optionally selected. Six clamping elements 169 contacting the outer wall of the clamping pin 137 can also be provided in the embodiment example shown here—as in FIG. 2. However, only three clamping elements 169 may also be sufficient as the case may be.

In the applied state of the clamping elements 169 the outer diameter of the clamping pin 137 in the area of the head area 169/1 is so small that the clamping pin can be inserted into the recess 109 in the fitting pivot 107 by the head area 169/1 of the clamping elements 169.

When the clamping elements 169 are swiveled into their applied position by the action of the elastic restoring members or rubber rings 189, the fitting pivot 107 of the tool carrier 105 can be inserted into the clamping shaft 103 so that the radial contact surfaces 113 and 115 contact one another. The clamping elements 169 project into the interior of the fitting pivot 107. The actuating member 141 or eccentric can then be turned around its rotational axis 143 by means of a suitable socket wrench via the hexagon socket 145. The eccentric pin 151 is accordingly displaced inside the groove 152 in such a way that the clamping pin 137 is displaced to the left-hand side out of the position shown in FIG. 4 into the position shown according to FIG. 3. The clamping elements 169, which are freely movable in the axial direction, are accordingly displaced against the abutment 155. Their head area 169/1 lies on the second clamping surface 171 and is displaced outward in the radial direction. The head area accordingly also makes contact with the first clamping surface 119, so that the tool carrier 105 is reliably drawn into the interior of the clamping shaft 103. Thus, as a whole, it can be seen that during a displacement of the clamping pin 137 to the left due to the actuation of the eccentric 141 the clamping elements 169 are finally prevented from an axial displacement in that their end area 169/2 stops at the abutment 155. The head areas 169/1 are accordingly clamped between the two clamping surfaces 119 and 171 in an optimal manner. The clamping forces acting in the head area can also result in a displacement of the clamping elements 169 in the axial direction. That is, tolerance differences in the longitudinal dimensions of the clamping elements are compensated for during the clamping process. A particularly good contact of the two parts of the interface 101 is accordingly ensured.

As shown by way of example in FIGS. 3 and 4, the head area 169/1 of the clamping elements 169 can be constructed in such a way that it also contacts the base of the annular groove 177 in as flat a manner as possible in the clamped state according to FIG. 3 and thus develops a force acting outward in the radial direction. A particularly high rigidity of the interface results from the contact of the head area 169/1 at the clamping surfaces 119 and 171 as well as at the base of the annular groove 117.

A relatively low friction results during the clamping process because the eccentric 141 acts directly on the clamping pin. Particularly high clamping forces can accordingly be applied during the rotation of the eccentric without the risk of excessive loading of the eccentric pin 151. The torque applied during a rotational movement of the eccentric is also transformed into clamping forces with low losses by means of the direct engagement of the actuating member constructed as eccentric 141. Moreover, the interface shown in FIGS. 3 and 4 is distinguished by a very simple construction.

The connection between the clamping shaft 103 and the tool carrier 105 is loosened by turning the eccentric 141 in the opposite direction. The clamping pin 137 is accordingly displaced to the right into its unlocking position, according to FIG. 4, out of its locking position according to FIG. 3. The clamping elements 169 can be swiveled into their applied position at the outer surface of the clamping pivot by the restoring forces of the rubber rings 189, so that the clamping forces acting on the contact surfaces 119 and 171 are canceled.

It can be seen from FIG. 4 that the end face 127 of the connecting branch 123 can also be displaced to the left by a slight change in the geometry of the connecting branch until the end face 173 of the clamping pin 137 stops against the end face 127 when the clamping pin 137 is displaced into its unlocking position and accordingly pushes the fitting pivot 107 out of the clamping shaft 103 somewhat. That is, the eccentric 141 can be utilized not only for locking the two parts assigned to the interface 101, but also for their active separation.

The arrangement of the interface 101 on the machine tool is not critical to its operation. For example, it is possible to anchor the clamping shaft 103 in a machine tool with a clamping cone.

Figure 5:
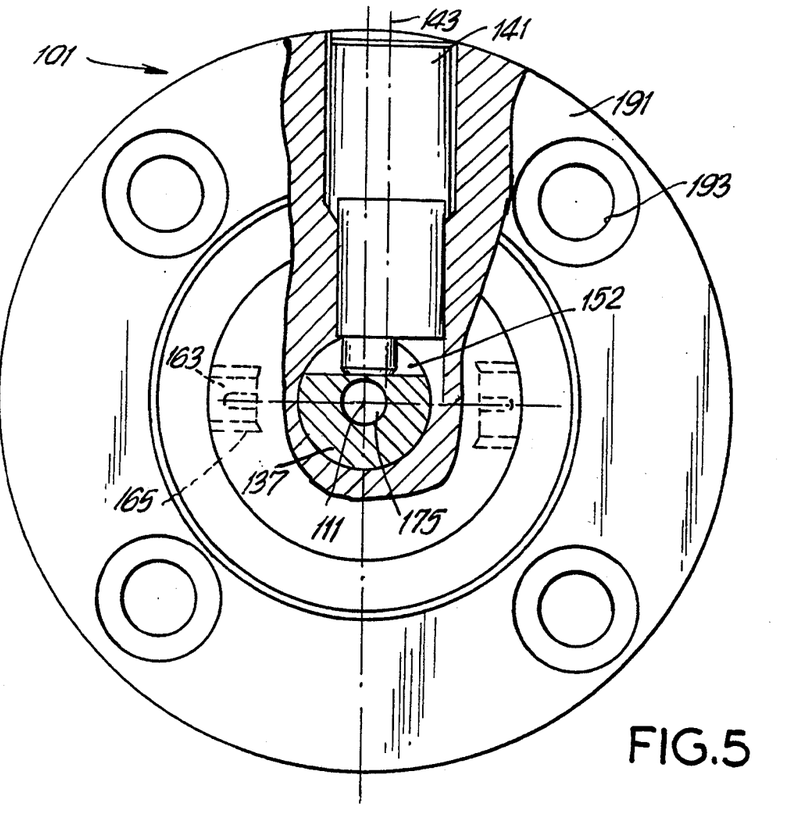
FIG. 5 shows a schematic top view of the interface according to FIG. 1 with a partial section through the wall area receiving the eccentric.

In the embodiment example shown here, as can be seen from FIGS. 3 to 5, an assembly flange 191 is provided which encloses the base body of the clamping shaft 103. In the view according to FIG. 5, a partial section is provided which shows more exactly the arrangement of the eccentric 141 in the assembly flange. Identical parts are provided with the same reference numbers so that an extensive description thereof can be dispensed with.

The assembly flange 191 is penetrated by four through-holes 193 serving to receive the fastening screws.

The number and arrangement of the through-holes is optional. In FIGS. 3 and 4, one of the through-holes has been shifted in the sectional plane.

The interface 101 shown in FIG. 5 can be fastened to a machine tool in a suitable manner by means of four fastening screws penetrating the assembly flange 191. In order to relieve the fastening screws, the shoulder 195 of the clamping shaft 103 projecting over the assembly flange 191 can comprise at least individual flattened areas at the circumference which cooperate with corresponding contours at the machine tool and form a positive locking engagement.

FIG. 5 also shows a possible arrangement of the projections 163 which have been shifted in the section plane selected in FIGS. 3 and 4. The number and arrangement of projections and respective recesses 165 in the fitting pivot 107 can be adapted to the given conditions.

FIG. 5 shows that the groove 152 is constructed in such a way that the groove base forms a chord of a circle, so to speak, in the sectional surface of the clamping pin 137.

The arrangement of the eccentric 141 is optional for the operation of the actuating member. In the embodiment example shown here, the center axis 143 of the eccentric 141 is shifted relative to the rotational axis 111 of the clamping shaft 103 and tool carrier 105. However, it is also very possible for the center axis 143 to intersect the rotational axis 111 of the interface 101.

Figure 6:
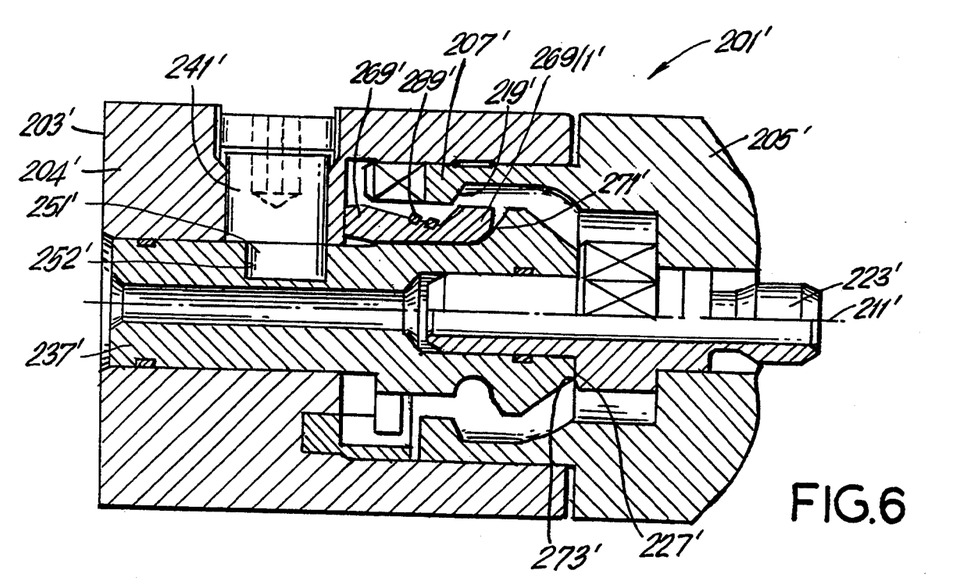
FIG. 6 hows a schematic longitudinal section through another embodiment example of an interface.

The longitudinal section according to FIG. 6 shows another embodiment example of an interface 201' showing the connection of a clamping shaft 203' with a tool carrier 205'. The embodiment example shown here differs from that according to FIGS. 3 to 5 only in that no assembly flange is provided. In this case, the eccentric 241' serving as actuating member only penetrates the wall 204' of the clamping shaft 203' and engages, by its eccentric pin 251', with the clamping pin 237' which is constructed in the same manner as the clamping pin 137 in FIGS. 3 to 5 in other respects. Thus, it also comprises a groove 252' which extends transversely relative to the center axis 211 and serves to receive the eccentric pin 251'.

In FIG. 6, the clamping pin 237' is brought into its foremost position, the unlocking position, so that the front side 273' of the clamping pin 237 stops at the end face 227' of the connecting branch 223' and accordingly presses the fitting pivot 207' of the tool carrier 205' somewhat out of the recess in the front side of the clamping shaft 203.

In this position, the clamping elements 269' are brought into their reset position by elastic restoring elements 289', so that their surface facing the clamping pivot 237' contacts the outer surface area of the latter. For this purpose, they can be provided on their rear side with a planar contact surface as can be seen from FIG. 6.

In the embodiment form shown here, the clamping elements 269' are also accommodated in the receiving pockets in the outer surface area of the clamping pin 237'. These receiving pockets can be produced by a grinding or milling process or—according to FIG. 2—by intermediate walls introduced into the outer surface area of the clamping pin.

The head 269/1' of the clamping elements 269' can be more or less spherical or rounded in section according to FIGS. 3 to 5, or, as shown in FIG. 6, can have two practically parallel clamping surfaces which cooperate with the contact surfaces 219' at the fitting pivot 207' and the contact surfaces 271' at the clamping pin 237'. The contact surface between the clamping elements 269' and the clamping pin 237 is constructed in such a way that the clamping elements 269' are swiveled outward radially during the displacement of the clamping pin 237' so that the two parts of the interface 201' are clamped together.

It can also be seen clearly in the embodiment example shown in FIG. 6 that a displacement of the clamping pin 237' which is particularly low in friction is made possible by constructing the actuating member as an eccentric 241', so that the forces transmitted to the actuating member and eccentric 241' are transformed into clamping forces with low losses. This provides for a particularly secure gripping of the two parts of the interface 201', but also for an especially exact alignment.

Figure 7A:
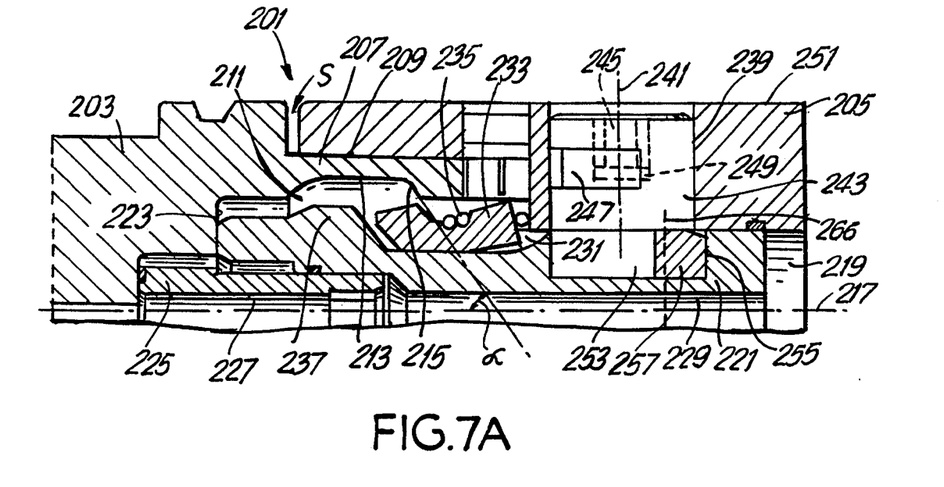
FIG. 7A shows a longitudinal section through an interface at a first clamping state, at which clamping has not yet been effected.
Figure 8A:
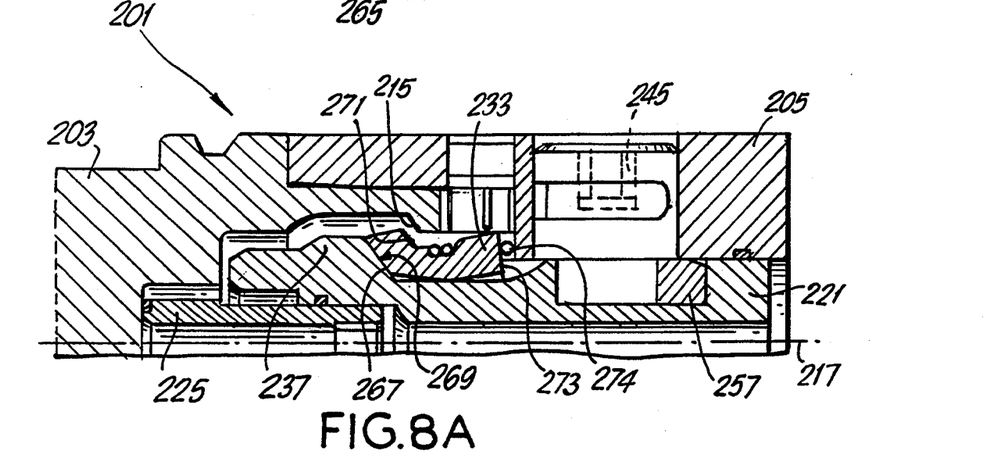
FIG. 8A shows a longitudinal section trough an interface at a second clamping state, at which clamping forces are applied to parts assigned to the interface.
Figure 8B:
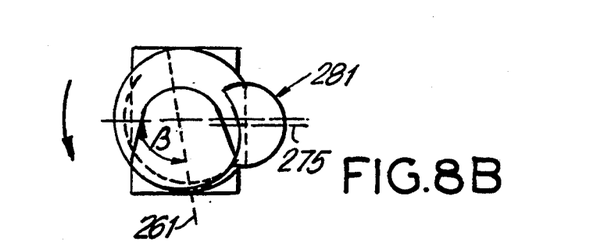
FIG. 8B shows a view similar to that of FIG. 7B.
Figure 9A:
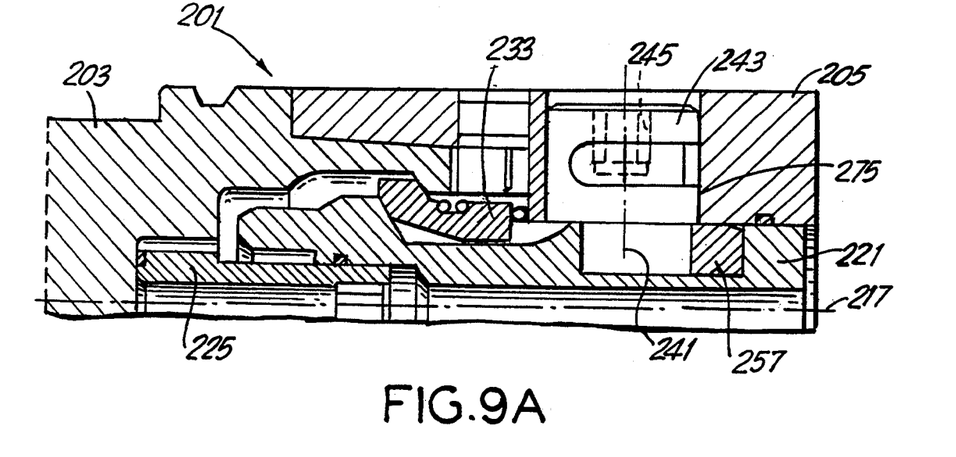
FIG. 9A shows a longitudinal section through an interface at a third clamping state, at which clamping has been completed.

A longitudinal section through an interface is shown in FIGS. 7, 8 and 9, wherein different clamping states are shown. Parts of the interface have been broken off to the right and to the left in FIGS. 7 to 9 for improved clarity.

FIG. 7 shows an interface 201 with a clamping shaft 203 in which a tool carrier 205 has been inserted. A clamping has not yet been effected. The clamping shaft 205 comprises a fitting pivot 207 which has been inserted into a recess 209 arranged in the front side of the clamping shaft 203. The inner diameter of the recess is selected in such a way that the fitting pivot can be inserted without play.

The fitting pivot in turn is constructed so as to be hollow and encloses a free space 211 comprising a circumferentially extending annular groove 213 and an annular shoulder 215 defining the latter. This annular shoulder 215 serves as a first clamping surface and extends at an angle α relative to the rotational axis 217 of the interface 201. The angle can be determined within a wide range. It is substantial that the annular shoulder 215 forms a first stop face at which clamping elements, discussed in the following, can engage. The annular shoulder is formed in that the inner diameter of the wall area which adjoins the annular groove 213 and intersects the front side of the fitting pivot 207 is smaller than the rest of the annular groove.

The tool carrier 205 in turn has a hollow construction. A clamping pin 221 which is displaceable in the direction of the rotational axis 217 and extends as far as the free space 211 in the fitting pivot 207 is inserted in the interior 219 of the tool carrier 205. The clamping pin 221 stops against the base 223 of the free space 211 with its left-hand front side. A connecting branch 225 which, like the clamping pin 221, is provided with a through-channel 227 is inserted into the front side of the clamping pin 223 and communicates in a fluid connection with the channel 229 in the clamping pin 221, which channel 229 extends concentrically relative to the rotational axis 217. A coolant and/or lubricant can be directed through the clamping shaft and through the tool carrier as far as the tool as a result of this construction of the interface.

A plurality of receiving pockets 231, preferably three, extending in the direction of the rotational axis 217 are introduced into the outer surface area of the clamping pin at the circumference, the clamping elements 233 being accommodated in these receiving pockets 231. The length of the clamping elements 233 is smaller than the longitudinal extension of the receiving pockets so that the clamping elements 233 are displaceable in the direction of the rotational axis 217.

The clamping elements 233 are pressed against the outer surface area of the clamping pin 221 and against the base of the receiving pockets 231, respectively, by elastic retaining devices which are preferably designed as elastic rings 235. A preferably circumferentially extending annular shoulder 237, whose outer diameter corresponds to the outer diameter of the clamping elements 233 when the latter, as shown in FIG. 7, contact the base of the receiving pockets 231 in their swiveled back position, is provided to the left of the front end of the clamping elements 233—that is, in the connecting direction in front of the clamping elements. The base of the receiving pockets extends substantially parallel to the rotational axis 217 of the interface 201. The clamping elements 233 comprise a preferably planar supporting area so that they lie in the receiving pockets without tilting.

A recess 239 whose center axis 241 lies substantially vertically relative to the rotational axis 217 is introduced into the wall of the clamping shaft 203. An actuating member constructed as an eccentric 243 is rotatably inserted into this recess. It can be outfitted with a hexagon socket 245, indicated here in dashed lines, for actuation. A groove 247 which extends circumferentially at practically the same height is introduced into its outer surface area for defining the rotational movement of the eccentric. The end 249 of the groove 247 can serve as a stop for a limiting pin, not shown.

The height of the base body of the eccentric 243 is selected in such a way that it does not project over the outer surface area 251 of the clamping shaft 203. On the other hand, an eccentric pin 253 springs from the base body of the eccentric 243 into the interior 219 of the clamping shaft 203 and comes to rest in a recess 255 in the outer surface area of the clamping pin 221. A sliding piece 257, whose height corresponds to the height of the eccentric pin, is also accommodated in the recess 255 in addition to the eccentric pin 253. The dimensioning of the eccentric pin 253 and sliding piece 257, as measured in the direction of the rotational axis 217, is selected in such a way that the two parts are arranged in the recess without play. An axial displacement of the two parts within the recess 255 is accordingly not possible without a simultaneous displacement of the clamping pin 221 in the direction of the rotational axis 217.

Figure 7B:
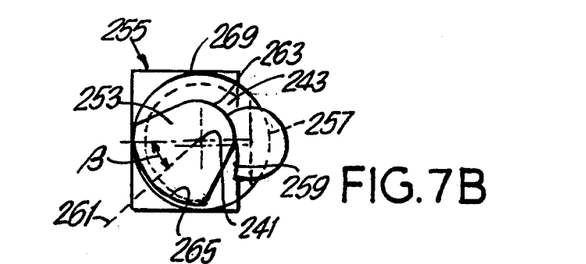
FIG. 7B shows a top view of a portion of the interface, shown in FIG. 7A, along axis 241.

A top view of the underside of the eccentric 243 and sliding piece 257 is shown above the sectional view in FIG. 7 in order to make clear the function and alignment of the eccentric pin 253 and sliding piece 257. The contours of the recess 255 in the outer surface area of the clamping pin 221 are also indicated.

The sliding piece 257 is constructed so as to be substantially round as seen from the top. A concave recess which is preferably constructed in the shape of a circular arc and serves as contact surface 259 for the eccentric pin 253 is inserted in the outer surface of the sliding piece 257 on its side facing the eccentric pin 253.

The radius of the outer surface area of the sliding piece 257 is designated by R1, the radius of the contact surface 259 by R2.

The underside of the sliding piece 257 serves as a sliding surface and is therefore constructed in a planar manner. The upper side is curved and preferably has the shape of a circular arc, wherein the radius of curvature of the circular arc corresponds to the radius of the outer surface area of the clamping pin 221.

The eccentric pin 253 is symmetrically constructed, its axis 261 of symmetry is shown in dashes. It encloses the angle $\beta$ with the horizontal line in the position of the eccentric pin according to FIG. 7. A rear outer surface area 263 of the eccentric pin 253, which is preferably constructed in the shape of a circular arc, contacts the contact surface 259 of the sliding piece 257. A pressure surface region 265 is provided opposite the rear outer surface area 263, its radius R3 being greater than that of the rear outer surface area 263 and its magnitude being adapted to the radius R2 of the contact surface 259 of the sliding piece 257. The radii R3 and R2 are preferably identical. The distance of the rear outer surface area 263 from the center axis 241 of the eccentric 243 or eccentric pin 257 is less than the distance of the pressure surface region 265 from the center axis 241.

The pressure surface region 265 and the rear outer surface area 263 are connected with one another by straight-line portions, wherein the latter enclose an angle opening in the direction of the pressure surface region 265 and are arranged so as to be symmetrical to the axis 261 of symmetry. Thus, as seen from the top, the eccentric pin 253 has a shape which is approximately comparable to a parabola, wherein the rear outer surface area 263 forms the arc-shaped crown of the parabola. The oppositely curved pressure surface region 265 is arranged opposite this area.

The sliding piece 257 is constructed in a substantially crescent-shaped manner as seen from the top. The circular arc segment of the contact surface 259 is open in the same direction as the remaining circular arc segment 281 of the rest of the outer surface of the sliding piece 257. The circular arc segment 281 has an opening angle of approximately 110°–300°, particularly 180°–280°, and preferably 240°. As a result of the circular arc-shaped outer surface, the sliding piece is movably supported in the recess 255 in the clamping pin 221 so as to be swivelable around its swivel axis 266 extending parallel to the center axis 241 of the eccentric 243.

FIG. 8 again shows the interface 201 shown in FIG. 7. Identical parts are provided with the same reference numbers so that an extensive description thereof can be dispensed with.

While the two parts of the interface 201, that is, the clamping shaft 203 and the tool carrier 205, have only been inserted one inside the other in the view according to FIG. 7, FIG. 8 shows a state in which the eccentric 243 has been turned so that the clamping is transmitted to the parts assigned to the interface 201. This can be seen in that the axis 261 of symmetry of the eccentric pin 253 encloses an angle of $\beta > 90°$ with the horizontal line. While in FIG. 7 the rear outer surface 363 of the eccentric pin 253 engages with the contact surface 259 of the siding piece 257, the pressure surface region 265 contacts the contact surface 259 due to the rotation of the eccentric.

It can be seen from FIGS. 7 to 9 that the distance of the rear outer surface area 263 of the eccentric pin 253 is less than the distance of the pressure surface region 265 relative to the center axis 241. Thus, when the sliding piece contacts the rear outer surface area of the eccentric pin in the position of the eccentric shown in FIG. 7 and now engages with the pressure surface region 265 of the eccentric pin, the sliding piece 253 is displaced relative to the center axis 241, i.e. shifted toward the right. A displacement of the clamping pin 221 to the right is effected due to the axial displacement of the sliding piece 257 in that the eccentric pin and sliding piece are accommodated in the recess 255 in the clamping pin 221 without axial play. Accordingly, the tool carrier 205 and the clamping pin 221 can also be displaced further to the right so that the tool carrier 205 can be inserted further into the clamping shaft 203 and the gap S between the facing contact surfaces of the clamping shaft and tool carrier, which can be seen in FIG. 7, is accordingly eliminated. That is, the base or front side 223 of the free space 211 contacting the end face of the clamping pin 221 can be displaced to the right by the displacement of the clamping pin 221 toward the right.

The connecting branch 225 is rigidly coupled with the tool carrier 205. Suitable sealing means prevent the coolant located in the interior of the connecting branch or clamping pin from escaping.

An inclined stop bevel 267 of the annular shoulder 237 of the clamping pin 221 engages with a stop face 269 extending at the same angle at the front side of the clamping elements 233 by means of the displacement of the clamping pin 221.

In the embodiment example shown here, the stop bevel 267 and the stop face 269 are inclined by approximately 60° relative to the horizontal line or rotational axis 217. The front part of the clamping elements 233 is lifted against the action of the elastic rings 235 by the pressure of the stop bevel so that a clamping surface 271 at the head of the clamping elements arranged opposite the stop face 269 finally engages with the annular shoulder 215.

If the stop bevel 267 abuts against the stop face 269, an axial displacement of the clamping element 233 is effected as far as the right-hand side in the Figures, that is, the rear end face of the clamping element abuts against a stop shoulder 274 of the clamping shaft 203 which projects into the interior 219. Thus, when the clamping pin is displaced, the clamping elements are first axially displaced until they abut at the stop shoulder 274. Continued displacement of the clamping pin effects the swiveling movement of the clamping elements, i.e. the end opposite the stop shoulder or the head of the clamping elements 233 is swiveled out—as seen in the radial direction—so that there is an increase in diameter.

Since all clamping elements 233 are freely movable independently of one another, slight discrepancies in the dimensions of the individual clamping elements relative to one another are compensated for in an optimal manner during the clamping, and uniform clamping forces are built up.

Figure 9B:
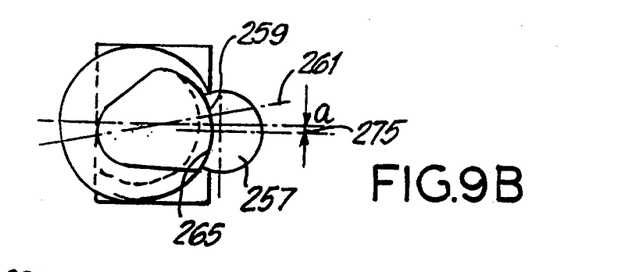
FIG. 9B shows a view similar to that of FIGS. 7B and 8B.

FIG. 9 shows the interface 201 in its clamped state. The eccentric 253 has now been turned entirely into its locking position. According to the top view of the underside of the eccentric, this corresponds to a rotation in the counterclockwise direction indicated by an arrow. The axis 261 of symmetry is turned beyond the horizontal line. The pressure surface region 265 of the eccentric pin 253 contacts the entire area of the contact surface 259 of the sliding piece 257, i.e. the clamping forces are transmitted to the sliding piece by the eccentric pin 253 over the surface area. This sliding piece contacts a concave defining wall of the recess 255 in the clamping pin with its rear outer surface area 263.

In this position of the eccentric 243, the clamping pin 221 is displaced entirely to the right into its locking position. As a result of the interplay of the stop bevel 267 of the annular shoulder 237 provided on the clamping pin 221 with the stop face 269 at the head of the clamping elements 233, a maximum swiveling of the clamping elements has taken place, so that the clamping surface 271 serving as second clamping surface is securely pressed against the first clamping surface or annular shoulder 215 on the inner surface of the fitting pivot 207. As a result of the swiveling movement of the clamping elements and the cooperation of the different clamping and contact surfaces, the fitting pivot 207 or tool carrier 205 is drawn securely into the clamping shaft 203. The annular surfaces of the clamping shaft 203 and tool carrier 205 defining the right and left sides of the gap S shown in FIG. 7 now contact one another securely and ensure an optimal alignment between the two parts of the interface 201.

The eccentric 243 is arranged in such a way that its center axis 241 intersects the rotational axis 217 of the tool. It can be seen from FIGS. 7 to 9 that the axis 275 of symmetry of the sliding piece 257 and accordingly also its swivel axis 266 is shifted relative to the center axis 241. FIG. 9 indicates this distance a. In this way the point of application of force between the sliding piece and clamping pin is situated below the connecting line of the center axis 241 of the eccentric 243 and the axis 275 of symmetry of the sliding piece 257. For this reason there is a toggle lever effect when clamping, so that the clamping force can be applied to the eccentric 243 by a lower torque.

A minimum axial displacement of the clamping pin 221 in the clamping direction is required for loosening the clamping of the interface 201, so that an additional loosening moment must be applied. Thus, there is a self-locking of the eccentric clamping, so that an unintentional unlocking of the clamping is ruled out in a highly reliable manner also during strong vibrations and loading.

Figures 10, 11:
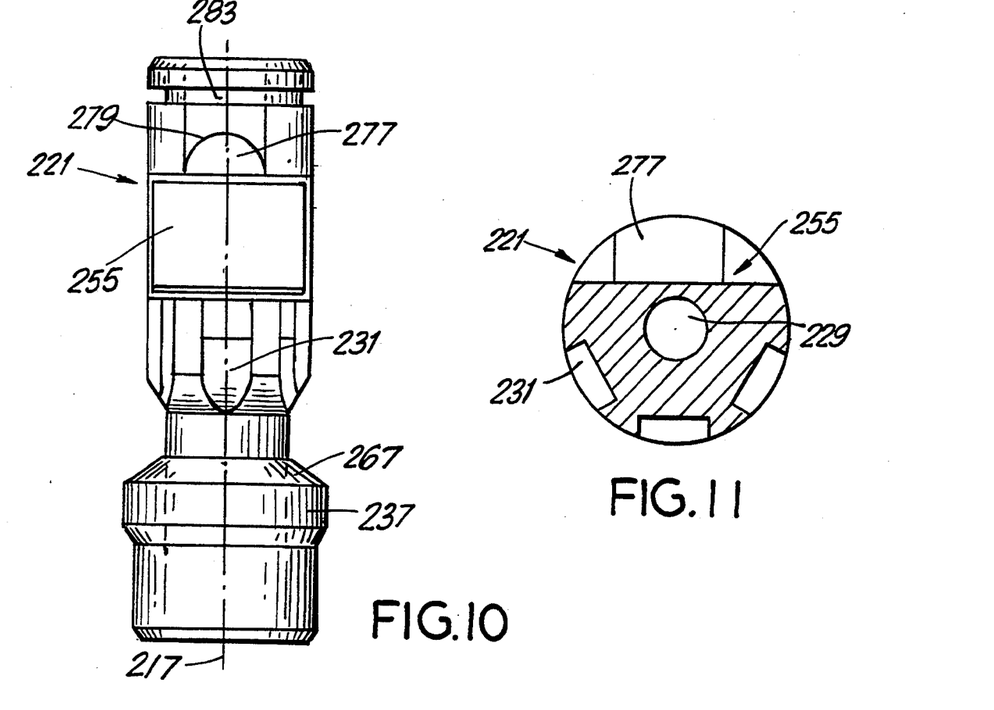
FIG. 10 shows a top view of a clamping pin shown in FIGS. 7 to 9.
FIG. 11 shows a section through a clamping pin according to FIG. 10.

FIG. 10 shows a top view of the side of the clamping pin 221 situated at the top in FIGS. 7 to 9. The recess 255 serving to receive the eccentric pin 253 as well as the sliding piece 257 can be seen clearly. The area of the recess 255 receiving the eccentric pin comprises a planar base surface and is constructed so as to be substantially rectangular. It can be produced in a simple manner, e.g. by inserting a groove extending vertically relative to the longitudinal or rotational axis 217 of the clamping pin 221. A portion 277 whose base area can form a surface with the base of the rectangular recess adjoins the area of the substantially rectangular recess 255 located along the rotational axis 217. This is always the case when the height of the eccentric pin 253 is selected so as to be equal to the height of the sliding piece 257.

The portion 277 is distinguished by an arc-shaped, preferably circular arc-shaped, wall area 279 whose radius is selected in such a way that the rear outer surface area 281 of the sliding piece 257 contacts this wall area along the surface area. In this way a surface-area contact is effected during the clamping process, so that line contact between the sliding piece and the wall area is prevented and the wear is particularly low.

The sliding piece 257 is held securely due to the construction of the portion 277. There is no need for an additional fastening or an axle for its support. Therefore, the tool can be realized in a simple manner. Moreover, a swivel or rotational movement of the sliding piece is enabled when the parts of the interface 201 are clamped or unclamped. Accordingly, a surface-area contact can be ensured between the eccentric pin and the sliding piece on the one hand and the sliding piece and clamping pin on the other hand. The wear caused by clamping and unclamping is accordingly reduced to a minimum, resulting in a very long service life of the interface.

It can be seen from FIG. 10 that the sliding piece 257 can be constructed so as to be relatively small. For this reason high-quality, very strong material can be used for the sliding piece without the costs of production for the tool being disadvantageously influenced. Since the sliding piece can be produced easily because of the simple form, the production costs are low also when high-strength materials such as steel, hard metal or ceramics are used.

It can be seen from FIG. 10 that the annular shoulder 237 is constructed in a circumferentially extending manner in this embodiment example. A continuous, circumferentially extending stop bevel 267 is accordingly provided for the clamping elements 233 not shown in FIG. 10. However, it is also sufficient that an area of a stop bevel be assigned to a clamping element so that no continuous annular shoulder with a continuous stop bevel need be provided.

FIG. 10 further shows that the receiving pockets 231 for the clamping elements 233 are constructed as grooves extending in the direction of the rotational axis 217 and accordingly can likewise be realized easily.

An annular groove 283 serving to receive a suitable sealing element, so that coolant or lubricant guided in the interior of the clamping pin 221 can also not escape when the clamping pin is displaced, can be seen in the area of the rear end of the clamping pin 221.

Finally, FIG. 11 shows a cross section through the clamping pin 221 which extends through the recess 255 on the one hand and, on the other hand, through the receiving pockets 231 for the clamping elements 233, which receiving pockets 231 are offset toward the front.

The channel 229 for the coolant or lubricant can be seen in the interior of the clamping pin 221. In the embodiment example shown here, six receiving pockets 231 are provided. The number of clamping elements can be optionally selected.

The sectional view shows that the base of the recess 25D is planar and extends vertically relative to the drawing plane in FIGS. 7 to 9. The sectional view according to FIG. 11 shows the portion 277 which serves to receive the sliding piece 257.

The clamping pin is preferably constructed in a circular shape in section.

On the whole, it can be seen that the interface 201 is constructed in a simple manner and serves for a reliable gripping of the clamping shaft 203 and tool carrier 205. An unintentional loosening of the parts is excluded in a highly reliable manner even when caused by vibrations. The transmission of the forces applied to the clamping pin by the eccentric 243 via the sliding piece is effected via contact surfaces so that punctiform or line loads are reliably ruled out. This results in low wear and a high durability of the interface. The forces required for producing the clamping are to be applied easily by means of hand-held tools so that the connection between the clamping shaft and tool carrier can be produced in a simple manner. The loosening of the two parts of the interface can also be effected easily by hand.

Moreover, FIGS. 7 to 9 show that the unlocking of the interface 201 is effected by means of a rotation of the eccentric 243 in the opposite direction. This corresponds to a rotation in the clockwise direction in the top view of the underside of the eccentric.

It can be seen, starting from FIG. 9, that the sliding piece 257 is first displaced somewhat toward the right again in the locking direction during the opening movement of the eccentric pin 253. That is, the opening moment is increased slightly—as described above—because of the toggle lever effect. As soon as the axis 261 of symmetry of the eccentric pin 253 has overcome the position, shown as horizontal in FIG. 9, in which the axis of symmetry extends parallel to the rotational axis 217 of the interface 201 a smaller torque results for unlocking the interface. During the opening process the eccentric pin 253 first achieves the position shown in FIG. 8 in which the axis 261 of symmetry of the eccentric pin 253 is almost vertical. As soon as the eccentric pin is rotated beyond the vertical position, the pressure surface region 265 exerts a shearing force on the left-hand defining surface of the recess 255 and accordingly pushes the clamping pin 221 to the left. This clamping pin 221 abuts against the base 223 of the free space 211 in the fitting pivot 207 with its front side and accordingly pushes the tool carrier 205 out of the clamping shaft 203 so that the gap S between the tool carrier and clamping shaft shown in FIG. 7 is formed again.

Thus, it can be seen that the actuating device of the interface 201 constructed as eccentric 243 is suitable for clamping the two parts, clamping shaft 203 and tool carrier 205, but also for pushing apart the two parts so as to enable a simple removal of the tool carrier from the clamping shaft.

On the whole, it can be seen that the interface described here can be arranged between a clamping shaft and a tool carrier, but also between a clamping shaft and a tool carrier, on one side, and an intermediate piece arranged between these parts on the other side.

We claim:

1. An interface between a-clamping shaft for receiving a tool carrier and the tool carrier, said interface comprising:

a hollow fitting pivot provided on the clamping shaft and having an inner wall and a first clamping surface provided on said inner wall;

a clamping pin located in an interior of the tool carrier and axially displaceable therein, said clamping pin having a second clamping surface;

a plurality of clamping elements arranged about a circumference of said clamping pin for axial movement there along, said clamping elements being radially movable, upon displacement of said clamping pin in a clamping direction, from a first position, in which they are disengaged from said first and second clamping surfaces, to a second position, in which they engage said first and second clamping surfaces whereby the tool carrier is clamped in the clamping shaft; and means for biasing said clamping elements to the first position thereof.

2. Interface according to claim 1, characterized in that the clamping elements are accommodated so as to be movable in the axial direction in receiving pockets provided on the outside of the clamping pin.

3. Interface according to claim 1, characterized in that the clamping pin comprises a continuous longitudinal channel for a coolant and/or lubricant, and in that sealing means are provided on its outer side.

4. Interface according to one of claim 3, characterized in that the front side of the clamping pin cooperates with a connecting branch springing away from the clamping shaft, the coolant or lubricant being guided through the connecting branch.

5. Interface according to claim 4, characterized in that the connecting branch is provided with a stop face against which the clamping pin can be moved for releasing the tool carrier.

6. Interface according to claim 5, characterized in that the first clamping surface in the fitting pivot is constructed as a circumferentially extending shoulder of an annular groove.

7. Interface according to one of claim 1, characterized in that the second clamping surface at the clamping pin is constructed as a circumferentially extending surface of an annular shoulder.

8. An interface according to claim 1, further comprising an actuating member for displacing said clamping pin axially.

9. An interface according to claim 8, wherein said actuating member comprises an eccentric extending substantially perpendicular to a rotational axis of said clamping pin.

10. An interface according to claim 9, wherein said eccentric comprises an eccentric pin, said interface further comprising a sliding piece provided between said eccentric and clamping pins, said sliding piece being rotatably supported on said clamping pin and being displaceable in an axial direction in said interface.

11. An interface according to claim 10, wherein said clamping pin has a recess in an outer surface thereof for receiving said eccentric pin and said sliding piece, said recess having an axial dimension, which insures locating said eccentric pin and said sliding pin in said recess substantially without play, whereby said clamping pin is being displaceable upon axial displacement of said eccentric pin and said sliding piece.

12. An interface according to claim 10, wherein said sliding piece has a crescent shape, in a top view, and an outer contour formed by first and second circular arcs facing in a same direction and having different first and second radii, respectively, the first circular arc having an opening angle of approximately 110° to 300°, and the second circular arc defining a concave recess, which is engageable by said eccentric pin.

13. An interface according to claim 12, wherein said opening angle is within a range of 180°–280°.

14. An interface according to claim 13, wherein said opening angle is 240°.

15. An interface according to claim 11, wherein said sliding piece has a planar sliding surface which abuts, in a clamped position of said interface, a planar base of said recess.

16. An interface according to claim 10, wherein said sliding piece has a curved outer surface formed as a circular arc and having a radius corresponding to a radius of an outer surface of said clamping pin.

17. An interface according to claim 12, wherein said eccentric pin has a pressure surface region pivotable about a rotational axis of said eccentric and having a radius corresponding to said second radius.

18. An interface according to claim 10, wherein said sliding piece has a pivot axis, which is shifted relative to a longitudinal axis of said clamping pin and does not intersect the longitudinal axis of said clamping pin.

* * * * *